(12) United States Patent
Sarma et al.

(10) Patent No.: US 11,619,722 B2
(45) Date of Patent: Apr. 4, 2023

(54) VEHICLE LIDAR POLARIZATION

(71) Applicants: Ford Global Technologies, LLC, Dearborn, MI (US); Massachusetts Institute Of Technology, Cambridge, MA (US)

(72) Inventors: Sanjay Emani Sarma, Lexington, MA (US); Dajiang Suo, Cambridge, MA (US)

(73) Assignees: FORD GLOBAL TECHNOLOGIES, LLC, Dearborn, MI (US); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 327 days.

(21) Appl. No.: 16/788,951

(22) Filed: Feb. 12, 2020

(65) Prior Publication Data
US 2021/0247505 A1 Aug. 12, 2021

(51) Int. Cl.
*G01S 7/4913* (2020.01)
*G01S 7/48* (2006.01)
(Continued)

(52) U.S. Cl.
CPC .......... *G01S 7/4913* (2013.01); *G01S 7/4802* (2013.01); *G01S 7/4911* (2013.01); *G01S 17/931* (2020.01);
(Continued)

(58) Field of Classification Search
CPC .................................................... G01S 7/4913
See application file for complete search history.

(56) References Cited

U.S. PATENT DOCUMENTS

| 6,522,407 B2 | 2/2003 | Everett et al. |
| 7,352,584 B1 | 4/2008 | Sung |

(Continued)

FOREIGN PATENT DOCUMENTS

| CN | 101498789 B | 10/2011 |
| KR | 20130123426 A | 11/2013 |

(Continued)

OTHER PUBLICATIONS

Yang, Jian, Global Autonomous Positioning in GNSS-Challenged Environments: A Bioinspired Strategy by Polarization Pattern, IEEE vol. 68, Issue 7 (https://ieeexplore.ieee.org/document/9097441)(2021).*

(Continued)

*Primary Examiner* — Jean Paul Cass
(74) *Attorney, Agent, or Firm* — Frank A. MacKenzie; Bejin Bieneman PLC

(57) ABSTRACT

A computer, including a processor and a memory, the memory including instructions to be executed by the processor to receive an emitted polarized light beam at a lidar receiver that determines a polarization pattern and a distance to an object, wherein the polarization pattern is determined by comparing a linear polarization pattern and a circular polarization pattern and identify the object by processing the polarization pattern and the distance with a deep neural network, wherein the identity of the object can be metallic or non-metallic. The instructions can include further instructions to operate a vehicle based on the identified object.

20 Claims, 8 Drawing Sheets

(51) Int. Cl.
  *G01S 7/4911* (2020.01)
  *G01S 17/931* (2020.01)
  *G05D 1/00* (2006.01)
  *G05D 1/02* (2020.01)
  *B60W 10/20* (2006.01)
  *B60W 10/18* (2012.01)
  *B60W 10/04* (2006.01)

(52) U.S. Cl.
  CPC ......... *G05D 1/0088* (2013.01); *G05D 1/0231* (2013.01); *B60W 10/04* (2013.01); *B60W 10/18* (2013.01); *B60W 10/20* (2013.01); *B60W 2420/52* (2013.01); *B60W 2710/18* (2013.01); *B60W 2710/20* (2013.01)

(56) References Cited

U.S. PATENT DOCUMENTS

| | | | |
|---|---|---|---|
| 8,125,370 | B1 | 2/2012 | Rogers et al. |
| 9,720,075 | B2 | 8/2017 | Milione et al. |
| 10,168,419 | B2 | 1/2019 | Trummer |
| 10,598,764 | B2 * | 3/2020 | Josefsberg .............. H03L 7/091 |
| 2007/0165227 | A1 | 7/2007 | Bauer et al. |
| 2012/0268571 | A1 * | 10/2012 | Debevec ................. G06T 7/586 348/48 |
| 2012/0268671 | A1 * | 10/2012 | Inoue .................... G02B 30/30 349/155 |
| 2016/0223671 | A1 * | 8/2016 | Thayer ................. G01C 13/008 |
| 2019/0128998 | A1 * | 5/2019 | Josefsberg ............ G01S 13/867 |
| 2020/0284882 | A1 * | 9/2020 | Kirillov ................ G01S 17/894 |
| 2020/0284883 | A1 * | 9/2020 | Ferreira .................. G01S 17/10 |
| 2021/0048695 | A1 * | 2/2021 | Philipp .............. G02B 26/0841 |
| 2021/0197720 | A1 * | 7/2021 | Houston .............. G06V 10/764 |
| 2021/0247490 | A1 * | 8/2021 | Fu ........................... G01S 17/58 |
| 2021/0247505 | A1 * | 8/2021 | Sarma ................... G01S 7/4913 |

FOREIGN PATENT DOCUMENTS

| | | |
|---|---|---|
| LU | 93302 B1 | 11/2016 |
| LU | 93431 B1 | 12/2016 |
| WO | WO-2021071995 A1 * 4/2021 ......... G01B 11/0641 |

OTHER PUBLICATIONS

Moreno, Igancio, Vector Beam Polarization State Spectrum Analyzer, Scientific Reports, Article 7, 2216 (Vector Beam Polarization State Spectrum Analyzer | Scientific Reports (nature.com)(2017).*

Ba, Y., et al., "Physics-based Neural Networks for Shape from Polarization," University of California, Los Angeles, Peking University, Mar. 25, 2019, 10 pages.

Chun, Cornell A. L., "Polarimetric laser radar target classification," Optic Letters, vol. 30, No. 14, Jul. 15, 2005, 3 pages.

* cited by examiner

VEHICLE LIDAR POLARIZATION

BACKGROUND

Vehicles can be equipped with computing devices, networks, sensors and controllers to acquire data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway.

DETAILED DESCRIPTION

Figure 1:
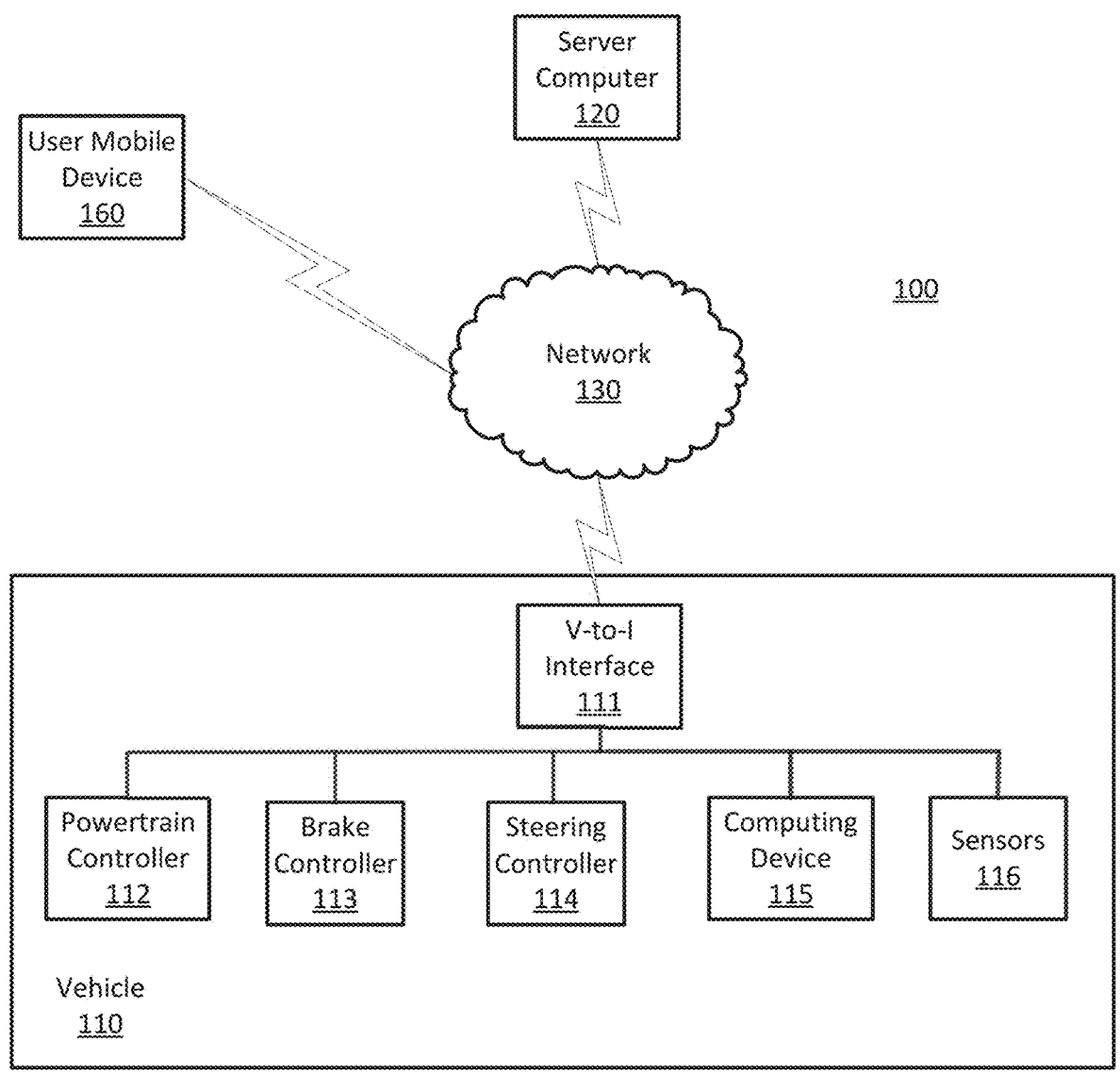
FIG. 1 is a diagram of an example traffic infrastructure system.

Vehicles can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous mode, none of these are controlled by a computer.

A computing device in a vehicle can be programmed to acquire data regarding the external environment of a vehicle and to use the data to determine a vehicle path upon which to operate a vehicle in autonomous or semi-autonomous mode. A vehicle can operate on a roadway based on a vehicle path by determining commands to direct the vehicle's powertrain, braking, and steering components to operate the vehicle to travel along the path. The data regarding the external environment can include the location of one or more moving objects such as vehicles and pedestrians, etc., in an environment around a vehicle and can be used by a computing device in the vehicle to operate the vehicle.

A type of sensor that can acquire data regarding the external environment is a lidar (Light Detection and Ranging) sensor. A lidar sensor emits a beam of light typically in the infrared (IR) wavelength range. Light is also referred to as optical radiation, and these terms will be used interchangeably herein. The light emitted by the lidar sensor is reflected by surfaces in the external environment and returned to the lidar sensor. The light beam is typically emitted by a laser to produce a directed beam of light with sufficient energy to be reflected by surfaces and detected by the lidar sensor. The lidar sensor processes the reflected light to determine a distance or range between the lidar sensor and the surface reflecting the light. A lidar sensor can determine a distance by emitting a pulse of light and measuring the time required to travel to and from the surface, referred to as time of flight (ToF) lidar. A lidar sensors can also modulate the light and measure a phase shift in the modulation of the returned signal to determine distance, referred to as frequency modulated continuous wave (FMCW) lidar. FMCW lidar can also measure a frequency shift in the received signal to determine a Doppler shift and thereby determine a velocity of the object with respect to the lidar sensor.

The light emitted by a lidar sensor can be scanned by means of electro-mechanical components including rotating mirrors or prisms to direct the beam of light to an array of locations in the environment. By synchronizing the measurement of distance with the scanning of the beam of optical energy, an array of data points corresponding to an image can be generated, where each pixel of the image corresponds to a distance measurement along a ray originating at the lidar sensor. By processing a lidar image generated in this fashion, a computing device can identify and locate objects in an environment external to the lidar sensor. Techniques described herein improve the ability of a lidar sensor to determine the identity and location of objects by polarizing the light emitted by the lidar sensor and measuring a polarization pattern of the returned light along with distance. The polarization pattern and the distance can be processed with a deep neural network to determine the identity and location of objects in an environment external to the lidar sensor.

Figure 6:
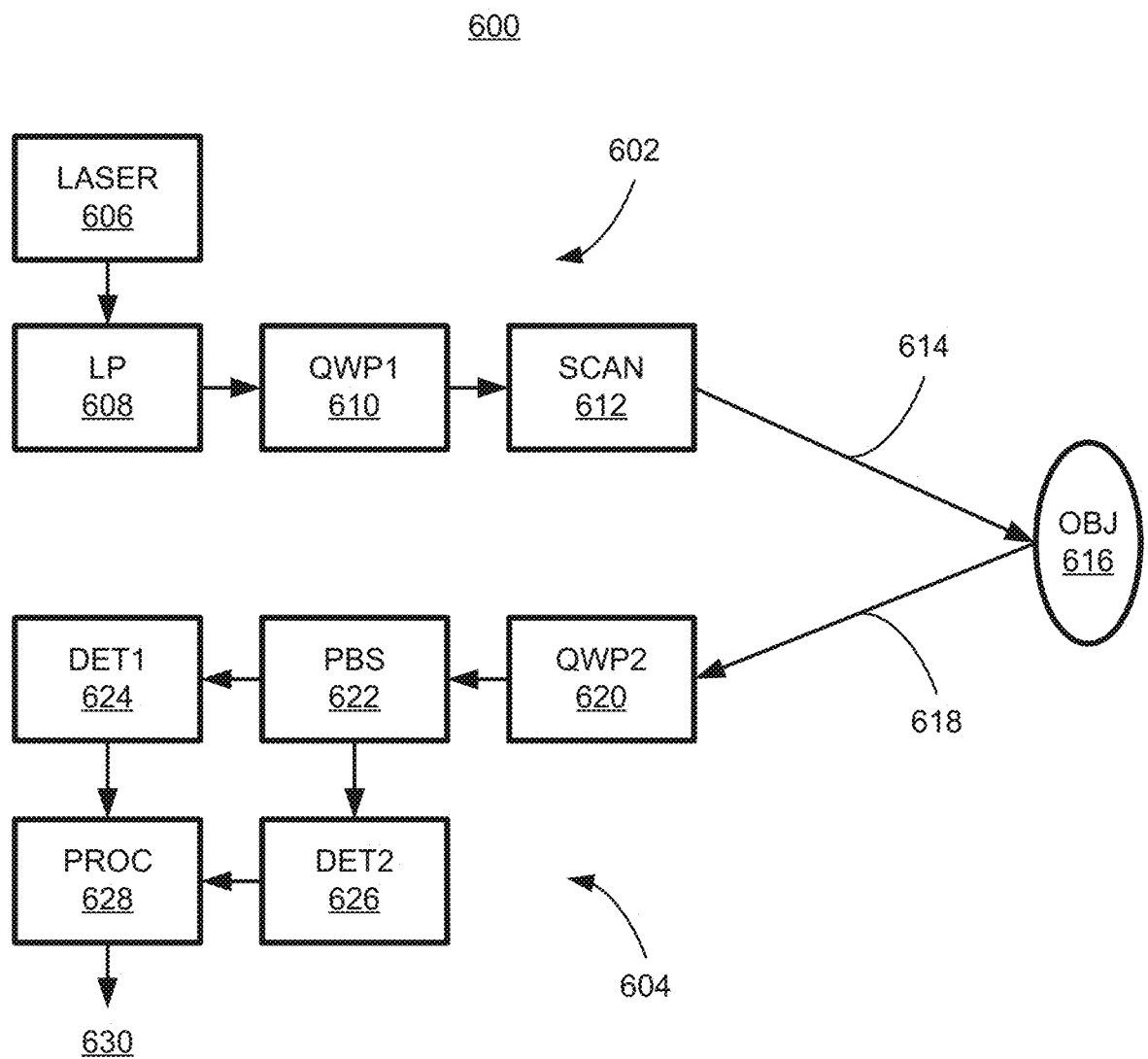
FIG. 6 is a block diagram of an example lidar sensor including polarized light.

Polarization patterns that combine polarization data with location data produced by a polarization sensor as described herein in relation to FIG. 6 can be combined with other types of sensor data. For example, polarization patterns can be combined with video, radar, or ultrasound sensor data. Video, radar, or ultrasound sensors can produce image data that can be aligned with polarization patterns based on data regarding the fields of view of the polarization sensor and the fields of view of the video, radar, and ultrasound sensors. A deep neural network can be trained to identify and locate objects based on combining polarization patterns with one or more of a video image, a radar image or an ultrasound image using techniques described in relation to FIG. 7, below.

Disclosed herein is method including receiving an emitted polarized light beam at a lidar receiver that determines a polarization pattern and a distance to an object, wherein the polarization pattern is determined by comparing a linear polarization pattern and a circular polarization pattern, identifying the object by processing the polarization pattern and the distance with a deep neural network, wherein the identity of the object is metallic or non-metallic and operating a vehicle based on the identified object. The linear polarization pattern can be compared to the circular polarization pattern by determining a ratio between an intensity of the linear polarization pattern and an intensity of the circular polarization pattern. The deep neural network can be trained by inputting the polarization pattern and the distance corresponding to the object into the deep neural network and comparing state cues to ground truth corresponding to the identity of the object. The linear polarization pattern can be determined by processing the received polarized light beam with an analyzer, wherein the analyzer measures a polarization angle of the received polarized light beam. The circular polarization pattern can be determined by processing the received polarized light beam with a quarter wave plate analyzer, wherein the quarter wave plate analyzer measures a circular polarization direction of the received polarized light beam.

The polarized light beam can be emitted as one or more of a pulse and a frequency modulated continuous wave, wherein the distance to the object is based on determining a time between emitting the polarized light beam and receiving the polarized light beam based on one or more of time of flight and phase shifting. The polarized light beam can be emitted through steering optics that direct the polarized light beam at a plurality of angles with respect to the emitter, wherein a direction to the object is determined by angles at which the polarized light beam was emitted at a time the polarization patterns and the distance were measured. An image of the polarization patterns and the distances can be formed based on the direction at which the polarized light beam was emitted at the time the polarization patterns and the distance were measured. The image of the polarization patterns and the distances can be input to the deep neural network to determine state cues related to the object where the state cues include a location and identity of the object. The vehicle can be operated by determining a vehicle path that avoids contact with the located, identified object. The vehicle can be operated by controlling one or more of vehicle powertrain, vehicle steering and vehicle brakes to travel on the vehicle path. The non-metallic objects can include one or more of foliage, pedestrians, and animals. The metallic objects can include one or more of vehicles, barriers, and traffic signs. The polarization pattern can be combined with one or more of video data, radar data, or ultrasound data.

Further disclosed is a computer readable medium, storing program instructions for executing some or all of the above method steps. Further disclosed is a computer programmed for executing some or all of the above method steps, including a computer apparatus, programmed to receive an emitted polarized light beam at a lidar receiver that determines a polarization pattern and a distance to an object, wherein the polarization pattern is determined by comparing a linear polarization pattern and a circular polarization pattern, identify the object by processing the polarization pattern and the distance with a deep neural network, wherein the identity of the object is metallic or non-metallic and operate a vehicle based on the identified object. The linear polarization pattern can be compared to the circular polarization pattern by determining a ratio between an intensity of the linear polarization pattern and an intensity of the circular polarization pattern. The deep neural network can be trained by inputting the polarization pattern and the distance corresponding to the object into the deep neural network and comparing state cues to ground truth corresponding to the identity of the object. The linear polarization pattern can be determined by processing the received polarized light beam with an analyzer, wherein the analyzer measures a polarization angle of the received polarized light beam. The circular polarization pattern can be determined by processing the received polarized light beam with a quarter wave plate analyzer, wherein the quarter wave plate analyzer measures a circular polarization direction of the received polarized light beam.

The computer can be further programmed to emit polarized light beam as one or more of a pulse and a frequency modulated continuous wave, wherein the distance to the object is based on determining a time between emitting the polarized light beam and receiving the polarized light beam based on one or more of time of flight and phase shifting. The polarized light beam can be emitted through steering optics that direct the polarized light beam at a plurality of angles with respect to the emitter, wherein a direction to the object is determined by angles at which the polarized light beam was emitted at a time the polarization patterns and the distance were measured. An image of the polarization patterns and the distances can be formed based on the direction at which the polarized light beam was emitted at the time the polarization patterns and the distance were measured. The image of the polarization patterns and the distances can be input to the deep neural network to determine state cues related to the object where the state cues include a location and identity of the object. The vehicle can be operated by determining a vehicle path that avoids contact with the located, identified object. The vehicle can be operated by controlling one or more of vehicle powertrain, vehicle steering and vehicle brakes to travel on the vehicle path. The non-metallic objects can include one or more of foliage, pedestrians, and animals. The metallic objects can include one or more of vehicles, barriers, and traffic signs. The polarization pattern can be combined with one or more of video data, radar data, or ultrasound data.

FIG. 1 is a diagram of a traffic infrastructure system 100 that includes a vehicle 110 operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (WI-FI®) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160. Server computer 120 can also function as a computing device 115 included in a roadside infrastructure, or edge, computing node, where an edge computing node is a computing device 115 included in or on a stationary infrastructure element such as a pole, a bridge, a wall, etc., and that acquires sensor data and communicates with vehicles 110 via Dedicated Short Range Communications (DSRC) or the like in a local portion of one or more of a roadway, parking lot or parking structure, etc.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, lidar, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
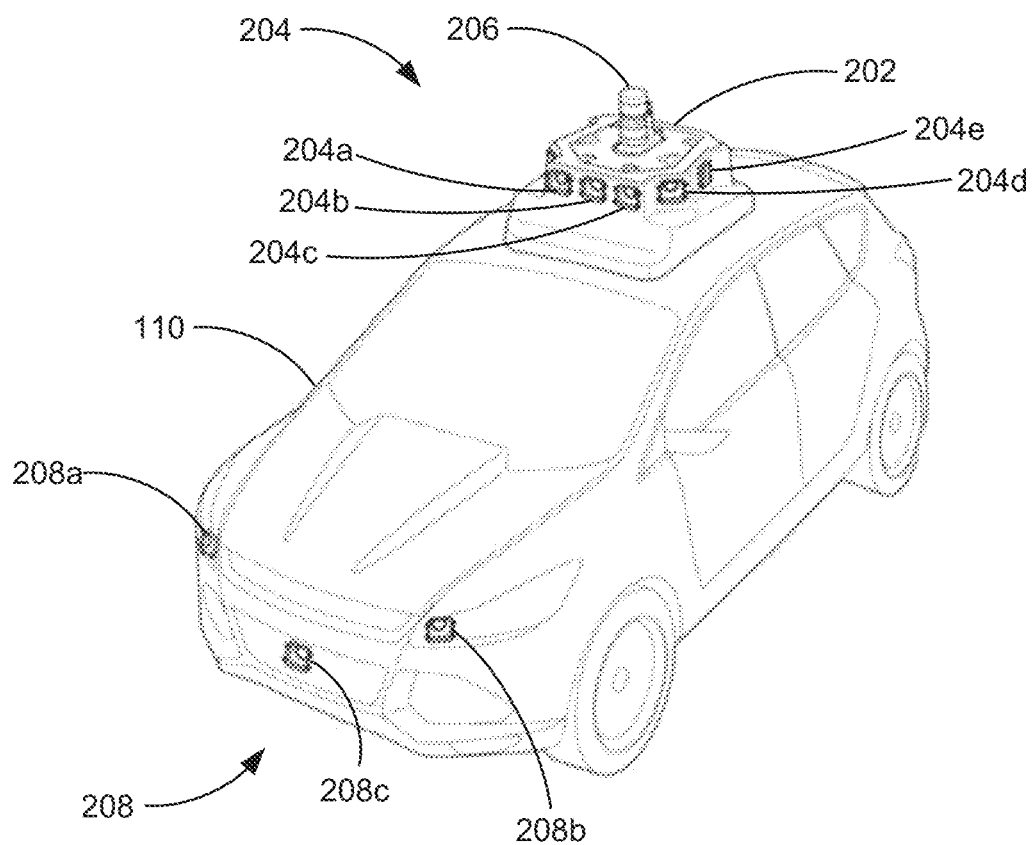
FIG. 2 is a diagram of an example vehicle with sensors.

FIG. 2 is a diagram of a vehicle 110 including a plurality of sensors 116 corresponding to multiple sensor modalities. A sensor modality means a medium in which a sensor detects physical phenomena, e.g., an acoustic medium, a portion of the electromagnetic spectrum, etc. Sensor modalities include lidar, video, radar and ultrasound, for example. Sensors 116 include a lidar sensor 206 and video sensors 204a, 204b, 204c, 204e, (collectively video sensors 204), all included in a sensor pod 202 attached to the roof portion of vehicle 110. Vehicle 110 also includes radar sensors 208a, 208b, 208c, (collectively radar sensors 208) included in a body portion of vehicle 110. A computing device 115 can acquire data from lidar sensor 206, video sensors 204 and radar sensors 208 and use the acquired data to operate vehicle 110 on a roadway. Operating a vehicle on a roadway can include detecting locations of objects including vehicles and pedestrians and avoiding contact with the objects.

Figure 3:
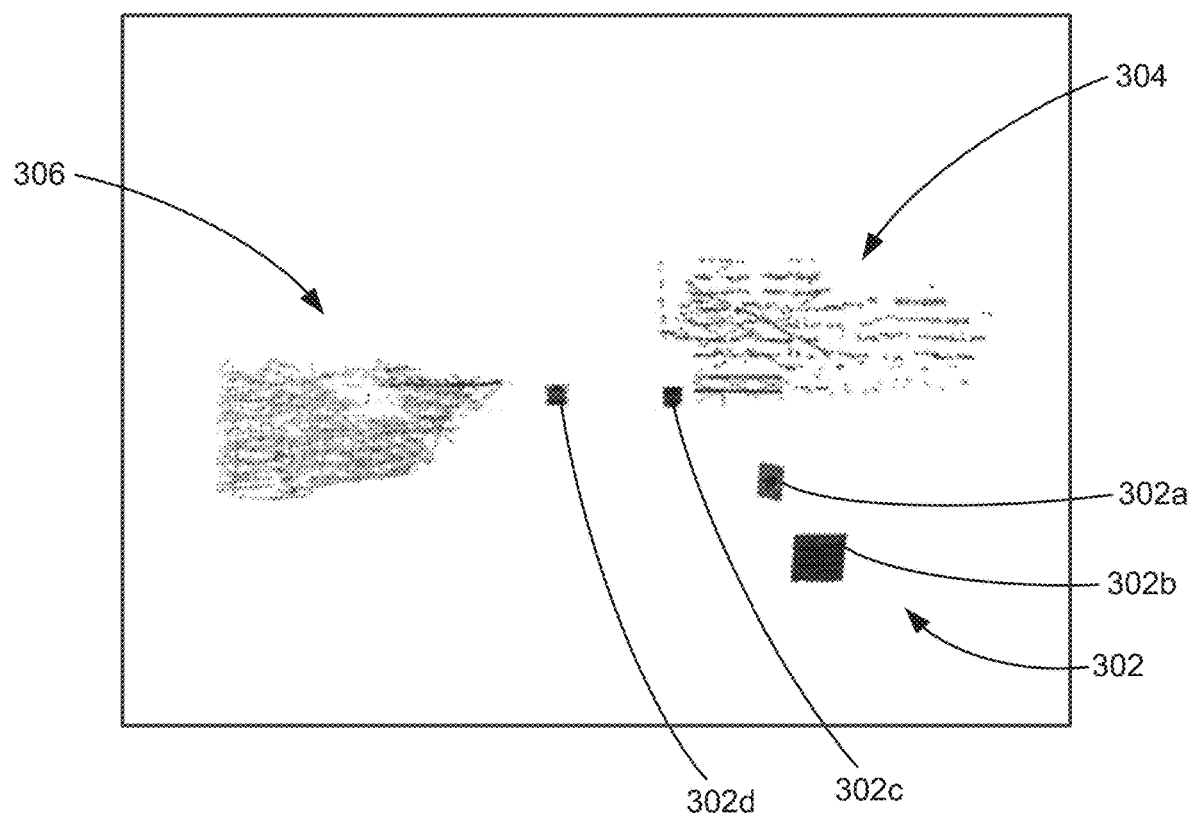
FIG. 3 is a diagram of an example lidar image.

FIG. 3 is a diagram of a lidar image 300 of point cloud data acquired by a lidar sensor 206. The lidar image includes regions of pixels corresponding to light returned from objects 302a, 302b, 302c, 302d, (collectively objects 302). In this example objects 302 are traffic signs positioned near a roadway upon which a vehicle 110 is traveling. Also included in lidar image 300 are background returns 304, 306 corresponding to received light from objects near a roadway including foliage and stone. Techniques disclosed herein can improve lidar sensor 206 data by determining a distance to a pixel and whether the pixel in a lidar image 300 can be labeled metallic or non-metallic.

The non-metallic label means that a pixel corresponds to an object composed of materials such as vegetation, dirt, concrete, rocks, wood, clothing, skin, fur, etc. Non-metallic materials can correspond to foliage, pedestrians, animals, buildings, barriers, etc. The metallic label means that a pixel corresponds to an object composed of materials including steel, aluminum, and painted metal that return reflected polarized light having polarization coefficients close to the maximum value of one. Metallic pixels can correspond to vehicles, traffic signs, and barriers. Non-metallic materials, including dirt, concrete, rock, wood, clothing, skin, fur, etc. can return reflected polarized light having polarization coefficients close to the minimum value of zero. By measuring the polarization coefficients of these materials empirically using a polarized lidar sensor 600 system as described below in relation to FIG. 6, e.g., in a laboratory or test bench setting, the polarization coefficients of materials that reflect polarized light can be classified as either metallic or non-metallic depending upon user selection of a threshold. A threshold value can be selected by a user to assign a metallic label to pixels with polarization coefficients and therefore degree of polarization (DOP) values above the threshold and assign a non-metallic label to pixels with polarization coefficients and therefore DOP values equal to or below the threshold. The relationship between polarization coefficients and DOP is described in relation to equations (1)-(4), below. The threshold value can be selected to assign either a metallic or a non-metallic label to polarization coefficient values determined for materials in an environment in the field of view of a polarizing lidar sensor 600, as will described below in relation to FIG. 6.

Figure 4:
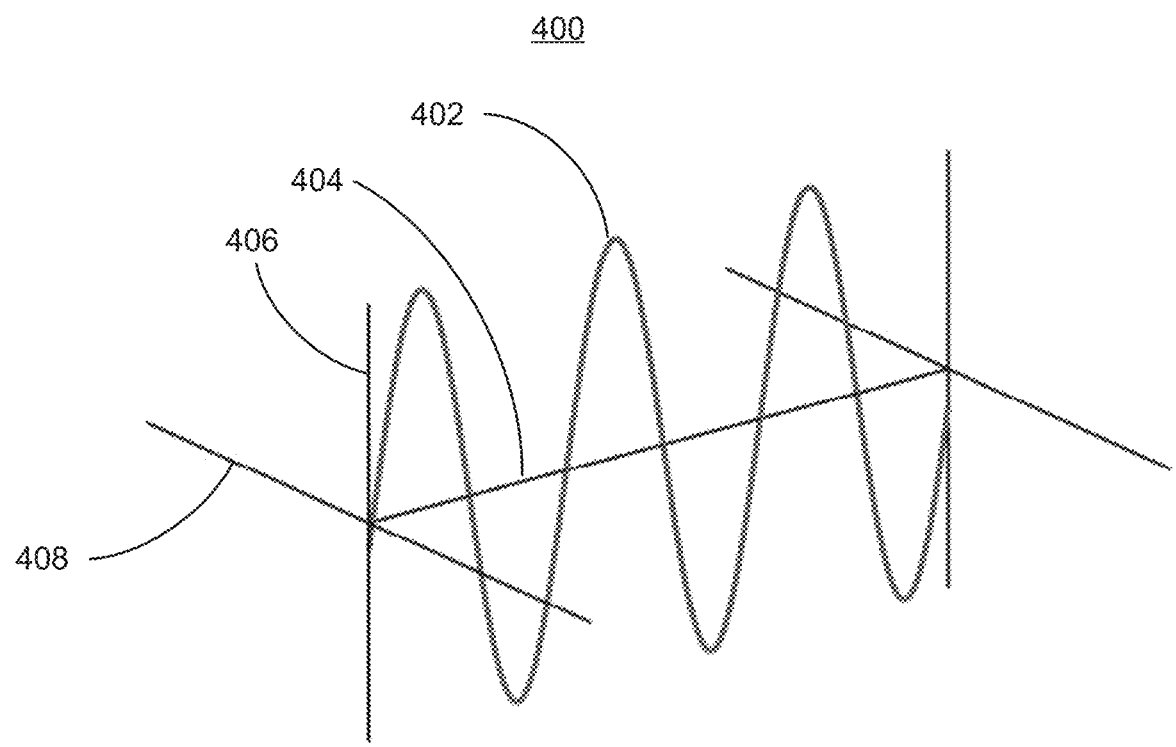
FIG. 4 is a diagram of example linearly polarized light.

FIG. 4 is a diagram of linearly polarized light 400. Linearly polarized light 400 corresponds to a light wave 402 representing the electrical portion of the electromagnetic waves included in linearly polarized light 400. The light wave 402 propagates from left to right along the z-axis 404, perpendicular to an x-axis 406 and y-axis 408. Linear polarization refers to the light wave 402 propagating along the z-axis 404 in a plane with respect to the x-axis 406 and y-axis 408. The plane can be at any angle with respect to the x-axis 406 and y-axis 408, but corresponds to only one plane. The angle at which the light wave 402 propagates with respect to the x-axis 406 and y-axis 408 is referred to as the angle of polarization.

Linearly polarized light 400 can be generated by passing non-polarized light through a polarizer. A polarizer is an optical component that can pass a light wave 402 w in a single plane as illustrated in FIG. 4. Light waves 402 oscillating at angles other than the single plane are blocked by the polarizer. Some lasers naturally generate linearly polarized light 400. Instruments like lidar sensors can use one or more lasers that naturally generate linearly polarized light 400. In an example where the one or more lasers are generating linearly polarized light, aligning the one or more lasers to ensure that the light is emitted at a desired polarization angle obviates the need for an external polarizer to generate linearly polarized light 400.

A polarizer can also be used to receive light. In examples where a polarizer is used to receive light, it can be referred to as a linear polarization analyzer. An analyzer is a linear polarizer coupled to a light detector that measures an intensity of incident light transmitted by the analyzer. Incident light is the light that falls on the analyzer. In this example incident light is light reflected by surfaces in the environment towards the analyzer. The analyzer transmits substantially all the incident light at the polarization angle equal to the polarization angle of the analyzer. The analyzer blocks incident light proportional to its difference in angle to the polarization angle of the analyzer. For example, light with a polarization angle at 90° to the angle of the analyzer will be completely blocked. An analyzer coupled to a light detector can determine the percentage of incident light that is polarized at the same angle as the analyzer.

Figure 5:
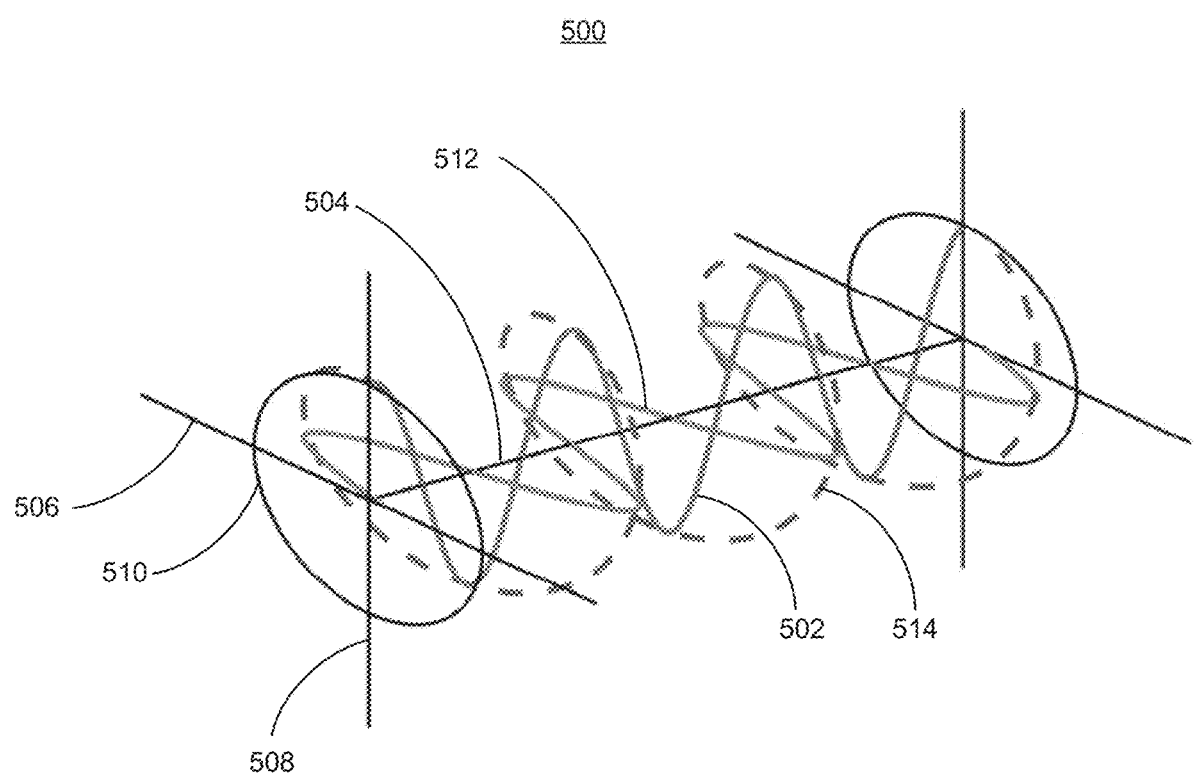
FIG. 5 is a diagram of example circularly polarized light.

FIG. 5 is a diagram of circularly polarized light 500. Circularly polarized light 500 can be formed from linearly polarized light 400 by passing the light through a quarter-wave plate 510. In this example, a first light wave 502 is propagating along a z-axis 504 from left to right parallel to the x-axis 508. Light wave 502 refers to the direction in which the electrical component of the first light 502 is oscillating. A quarter wave plate 510 is an optical component that divides the incoming light into a first light wave 502 propagating in an incoming direction of polarization and a second light wave 512 that is rotated at a right angle to the original direction and delayed by 90 degrees of phase with respect to first wave 502 to form a second light wave 512 parallel to the y-axis. Because electrical components of first and second light waves 502, 512 have the same frequency, albeit phase shifted, they combine linearly to form a third light wave 514 (dotted line). Third light wave 514 is formed by the vector sum of the electrical waves of first and second waves of light 502, 512 and as a result appears to spiral around the z-axis 504. This spiral oscillation in the direction of travel of the third light wave 514 is referred to as circular polarization. Quarter-wave plates 510 can be right- or left-handed and cause the circularly polarized light 500 to appear to rotate either clockwise or counter-clockwise.

A quarter-wave plate can be used as an analyzer for circularly polarized light. A quarter-wave plate set up as a receiver of incident light will divide, rotate and delay the incident light. If the incident light is circularly polarized in the same direction (left or right, as discussed in the preceding paragraph) the quarter-wave plate will exactly reverse the circular polarization, thereby transmitting unpolarized light at the original intensity. If the incident light is circularly polarized in the opposite direction, the quarter wave plate will divide, rotate and delay the incident light and extinguish the light due to destructive interference of the light waves. Coupling a quarter-wave plate analyzer with a light detector can determine the direction of circular polarization of incident light.

FIG. 6 is a block diagram of a polarization lidar sensor 600 that includes linear and circular polarization emission and detection. The polarization lidar sensor 600 can include an emitter section 602 that includes a laser (LASER) 606, a linear polarizer (LP) 608, a first quarter wave plate (QWP1) and a scanner (SCAN) 612. The polarization lidar sensor 600 also can include a detector section 604 that includes a second quarter-wave plate (QWP2), a polarizing beam splitter (PBS) 622, a first detector (DET1) 624, a second detector (DET2) 626, and a processor (PROC) 628.

Emitter section 602 includes a laser 606 that emits light, which can be IR light. The laser 606 can emit pulses of IR light or FMCW IR light as discussed above. The light emitted by laser 606 is passed to a linear polarizer 608 that linearly polarizes the light emitted by laser 606 as discussed above in relation to FIG. 4. In some examples the light emitted by laser 606 is naturally linearly polarized and linear polarizer 608 can be omitted. The light is then passed through a first quarter-wave plate 610. The quarter-wave plate 610 circularly polarizes a portion of the light as discussed above in relation to FIG. 5, thereby creating light $S_e$ 614 that includes linearly polarized light and circularly polarized light.

Following the quarter-wave plate 610, the light is passed through a scanner 612 that distributes the light beam in a pattern to permit the polarization lidar sensor 600 to generate a lidar image 300 based on the emitted light $S_e$ 614. The scanner 612 can use electro-optical components as discussed above in relation to FIG. 2 to distribute the emitted light $S_e$ 614 to locations in the environment around the polarization lidar sensor 600. In some examples the electro-optical components distribute the emitted light in both horizontal and vertical directions to form a x and y distribution of emitted light $S_e$ 614 rays. In some examples emitted light $S_e$ 614 can be emitted by a horizontal array of lasers 606, passed through linear polarizer 608 and first quarter wave plate 610 and then distributed vertically by the electro-optical components in scanner 612 to form an image. The emitted light $S_e$ 614 can impinge on a surface in the environment including a surface included in an object (OBJ) 616. The emitted light $S_e$ 614 reflected by the object 616 becomes reflected light $S_r$ 618.

The polarization state of emitted light $S_e$ 614 can be characterized by a Stokes vector $S_e=(I, Q, U, V)$. I is the total radiant intensity of the optical radiation, and can be measured in Watts/steradian. Q and U are the radiant intensities, also measured in Watts/steradian, of the optical radiation measured parallel (Q) to the angle of linear polarization of the emitted light $S_e$ and at 45° (U) to the angle of linear polarization of the emitted light $S_e$ 614 respectively. V is the radiant intensity, also measured in Watts/steradian, of the circularly polarized portion of emitted light $S_e$ 614 measured with respect to the direction (left-handed or right-handed) of the circular polarization of the emitted light $S_e$ 614.

The Stokes vector corresponding to the reflected light $S_r$ 618 can be determined by multiplying the Stokes vector corresponding to the emitted light $S_e$ 614 by a 4×4 Mueller matrix M, where $$M = \begin{bmatrix} 1 & 0 & 0 & 0 \\ 0 & M_{11} & 0 & 0 \\ 0 & 0 & M_{11} & 0 \\ 0 & 0 & 0 & M_{33} \end{bmatrix} \quad (1)$$

and $$S_r = M \cdot S_e \quad (2)$$

Mueller matrix values $M_{11}$ and $M_{33}$ are matrix coefficients that determine how much linearly polarized light and circularly polarized light, respectively, will be reflected by the surface. A Mueller matrix M can be used to determine light reflected by nonbirefringent materials. Birefringence is a property of a material where the refractive index of the material is dependent upon the polarization of the incident light. Birefringence is typically found in materials with non-cubic crystal structures such as calcite and some plastics under mechanical stress. Materials of interest herein, e.g., vegetation, pedestrians, vehicles, barriers, traffic signs, etc. are typically nonbirefringent.

Some typical values of Mueller matrix coefficients $M_{11}$ and $M_{33}$ for metallic objects like steel are approximately $M_{11}=0.9$ and $M_{33}=0.9$, as are known. Some typical values for non-metallic objects like wood are approximately $M_{11}=0.2$ and $M_{33}=0.16$, as are known. Non-metallic materials such as rock can have intermediate Mueller matrix coefficients of approximately $M_{11}=0.4$ and $M_{33}=0.4$, as are known, These values can be determined empirically by measuring the radiant intensities of linearly and circularly polarized light reflected off various materials with optical detector section 604 that can measure the optical radiation in Watts of light received through linear and circular polarizers. As discussed above in relation to FIG. 3, materials that return Mueller matrix coefficients near one such as steel and aluminum, etc. can be classified as metallic objects. Materials that return Mueller matrix coefficients of less than about 0.5 such as dirt, rock, concrete, wood, fabric, skin, fur, etc. can be classified as non-metallic. Techniques described herein combine Mueller matrix coefficients into a single DOP value prior to applying a threshold to identify metallic and non-metallic materials in reflected light $S_r$ 618. Techniques described herein improve identification of objects using polarized lidar sensor 600 data by inputting an image that includes distance measures and polarization patterns (DOP values) to a deep neural network. The deep neural network can learn to identify metallic and non-metallic objects based on training as described below in relation to FIG. 7.

The reflected light $S_r$ 618 can be received by detector section 604 of polarization lidar sensor 600. Reflected light $S_r$ 618 is first received by second quarter wave plate 620 of detector section 604. The second quarter wave plate 620 is arranged to convert light having circular polarization in a direction 90° to the linear polarization direction of emitted light $S_e$ 614. The reflected light $S_r$ 618 is then passed to polarizing beam splitter 622. Polarizing beam splitter 622 passes light having linear polarization equal to the polarization angle of emitted light $S_e$ 614 to first detector 624. Polarizing beam splitter 622 reflects light having a linear polarization angle in a direction 90° to the linear polarization direction of emitted light $S_e$ 614 to second detector 626. In this fashion, first detector can determine the portion of the reflected light $S_r$ 614 having linear polarization equal to the linear polarization of emitted light $S_e$ 614 using first detector 624=$I_1$ and the portion of the reflected light having circular polarization equal to the emitted light $S_e$ 614 using second detector 626=$I_2$.

The light detected by first and second detectors 624, 626 $I_1$, $I_2$ is then passed to processor 628. Processor 628 first sums the output from first and second detectors 624, 626 to form the total intensity=I of the reflected light $S_r$ 618.

$$I = I_1 + I_2 \quad (3)$$

Total intensity can be used by processor 628 to determine distance to the object 616 using either time of flight or phase shift as discussed above in relation to FIG. 3. The first and second polarization intensities $I_1$, $I_2$ can be combined by processor 628 to determine a degree of polarization (DOP) according to the equation:

$$DOP = \frac{I_1 + I_2}{I_1 - I_2} = \frac{1}{3}(2M_{11} + M_{33}) \qquad (4)$$

The DOP is directly related to values of $M_{11}$ and $M_{33}$ and therefore values of DOP determined by processor 628 correspond to the identity of materials reflecting the emitted light $S_e$ 614. Because polarization lidar sensor 600 keeps track of the location in space of polarization intensities $I_1, I_2$ as they are generated, the polarization intensities correspond to polarization patterns for linear polarization and circular polarization respectively. A linear polarization pattern can be combined with a circular polarization pattern by equation (4) to form a polarization pattern. A polarization pattern corresponds to a DOP where the location in space of the DOP with respect to the polarization lidar sensor 600 is known for each DOP measurement. The location in space of both the distance measurement and the DOP measurement is along a ray emanating from the polarization lidar sensor 600 that corresponds to the angles with respect to the x, y, and z axes at which the emitted light $S_e$ 614 was directed by scanner 612 at the time the reflected light $S_r$ 618 was input by detector section 604 and measured by processor 628.

Processor 628 outputs a combined distance and polarization pattern image 630 where each pixel of the output image can include data regarding the range or distance to an object 616 and a polarization pattern corresponding to the material of the object 616. Not every pixel includes a distance and polarization pattern measurement. For example, not every beam or pulse of emitted light $S_e$ 614 is reflected by an object 616 to form reflected light $S_r$ 614 with sufficient energy to permit detection by first and second detectors 624, 626. In examples where insufficient light energy is received by first and second detectors 624, 626, a zero or NULL can be inserted into the image at a pixel location corresponding to the receipt of insufficient energy, thereby indicating missing data.

Insufficient light energy corresponds to receiving less than the minimum radiance of light in Watts/steradian to permit the first and second detectors 624, 626 generate an electronic signal greater than a noise floor. A noise floor is the amount of electrical current generated by a detector in the absence of any input signal. When the first or second detectors 624, 626 receive input optical radiation that generates electrical signal having current greater than the noise floor, the detector can convert the electrical signals into a digital numbers and pass the digital numbers to processor 628 for processing according to equations (3) and (4), above, and determining a distance and DOP. Following processing to determine a distance and a DOP, the 3D spatial location of the distance and DOP measurements can be determined with respect to the polarization lidar sensor 600, and the distance and DOP can be stored as a distance and polarization pattern in a distance and polarization pattern image 630. The distance and polarization pattern image 630 can be passed to a deep neural network to be processed to determine identity and location of an object 616 in the field of view of polarization lidar sensor 600.

A computing device 115 included in a vehicle 110 can combine polarization pattern data from a distance and polarization pattern image 630 with image data from other imaging modalities. Other imaging modalities include video, radar, and ultrasound as discussed above in relation to FIG. 2. Computing device 115 can determine a location in 3D space corresponding to each pixel of an image corresponding to video, radar, and ultrasound based on data regarding the fields of view of each sensor. Data regarding the fields of view of each sensor can be determined by alignment data for each sensor determined by acquiring data regarding alignment patterns placed in the fields of view of the sensors when the sensors are installed in a vehicle 110 when the vehicle 110 is manufactured. Data regarding the alignment of a field of view of each sensor can be used to generate a combined polarization pattern and video image, a combined polarization pattern and radar image or a combined polarization pattern and ultrasound image, for example. A combined polarization pattern and video image, a combined polarization pattern and radar image or a combined polarization pattern and ultrasound image can be input to a trained deep neural network to determine an identity and location of an object in an environment around a vehicle 110.

A polarization lidar sensor 600 can be included in a vehicle 110 or can be a stationary sensor included in a traffic infrastructure system 100. A stationary polarization lidar sensor 600 can be mounted on a pole, a building, or other stationary platform near a roadway. A mobile polarization lidar sensor 600 can also be mounted on a drone, a robot or other mobile platform to acquire data regarding objects on or near a roadway. A computing device 115 included in a traffic infrastructure system 100 can acquire a distance and polarization pattern image 630 from a stationary or mobile polarization lidar sensor 600 included in a traffic information system 100 to determine an identity and location of objects on or near a roadway and download the data regarding an identity and location of objects to a computing device 115 included in a vehicle 110. The traffic infrastructure system 100 can also acquire image data from stationary or mobile video, radar, and ultrasound sensors and combine polarization pattern data with one or more of video, radar or ultrasound data. The combined polarization pattern and video, radar, or ultrasound data can be downloaded to a computing device 115 in a vehicle 110.

Figure 7:
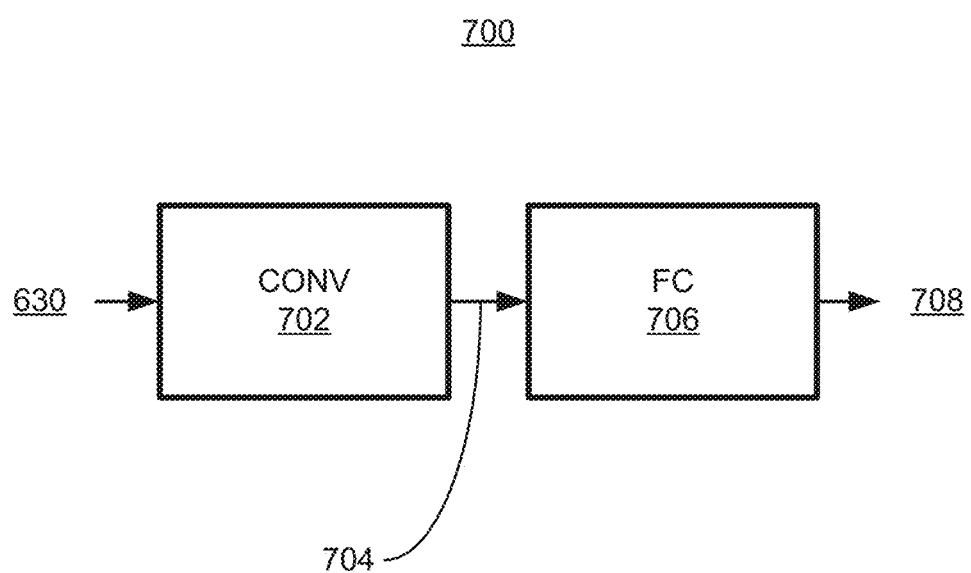
FIG. 7 is a block diagram of an example deep neural network.

FIG. 7 is a diagram of a deep neural network 700. Deep neural network 700 can input a combined distance and polarization pattern image 630, process the combined distance and polarization pattern image 630 and output state cues 708 that corresponds to the 3D location and identity of an object 616 in the field of view of a polarization lidar sensor 600. Deep neural network 700 includes convolutional layers (CONV) 702 and fully-connected layers (FC) 706. Convolutional layers input a combined distance and polarization pattern image 630 and convolve the combined distance and polarization pattern image 630 with convolution kernels that process the combined distance and polarization pattern image 630 to form hidden variables 704. The hidden variables 704 correspond to an encoding of the combined distance and polarization pattern image 630 that includes data regarding the location and identity of an object 616 included in combined distance and polarization pattern image 630.

Fully connected layers 706 input hidden variables 704 and process the hidden variables to generate state cues 708 corresponding to the 3D location and identity of an object 616 included in the combined distance and polarization pattern image 630. Fully connected layers 706 can compute linear or non-linear functions based on the hidden variables 704. Fully connected layers 706 are referred to as fully connected because each variable input as an element of the hidden variables 704 can be combined with every other variable input as elements of the hidden variables 704.

Deep neural network 700 can be trained to determine a 3D location and identity of an object 616 in a combined distance and polarization pattern image 630 by generating a large number (>1000) of combined distance and polarization pattern images 630 along with ground truth data regarding each combined distance and polarization pattern image 630. Ground truth data is data regarding the 3D location and identity of objects 616 included in each combined distance and polarization pattern image 630 obtained independently from deep neural network 700 processing. For example, ground truth data can be determined by an observer identifying and measuring the 3D location of the object 616 included in a combined distance and polarization pattern image 630.

During training a combined distance and polarization pattern image can be input to a deep neural network for a large number (<1000) of training trials. For each training trial, parameters corresponding to convolution kernels and fully connected functions are systematically altered and the resulting state cues 708 are back propagated to be compared to the ground truth data regarding the true 3D location and identity of the object 616. When the back propagated state cues 708 are determined to correspond to the ground truth data, the parameters that were used generate the state cues 708 are saved. This process is repeated for the large number of combined distance and polarization pattern images 630 with corresponding ground truth data and the set of saved parameters that processes substantially all of the combined distance and polarization pattern images 630 correctly based on the ground truth data determines the parameters that correspond to the trained deep neural network 700.

Polarization lidar sensor 600 improves detection and location of an object 616 in an environment around a vehicle by determining both distance data and a polarization pattern corresponding to the object 616. Determining both distance data and a polarization pattern permits a deep neural network to determine an identity and 3D location of an object 616. For example, deep neural network can determine an object 616 to be a vehicle, a pedestrian, a traffic sign, foliage, or concrete based on the polarization pattern and location of pixels corresponding to the object 616. Based on the identity and location of an object 616, a computing device 115 in a vehicle 110 can determine a vehicle path upon which to operate the vehicle 110 that corresponds to a roadway and avoids contact with the object 616.

Deep neural network 700 can be trained to determine identity and location data regarding an object 616 based on polarization pattern data combined with video, radar, or ultrasound data. In this example, ground truth data regarding the identity and location of an object 616 are generated in a plurality of training images that include combined polarization pattern and video, radar, or ultrasound image data. The ground truth data can be generated by an observer identifying and measuring the location of an object 616 included in the combined polarization pattern and video, radar, or ultrasound image. The ground truth data is compared to the back propagated state cues 710 generated by the deep neural network 700 in response to input combined polarization pattern and video, radar, or ultrasound image data.

Figure 8:
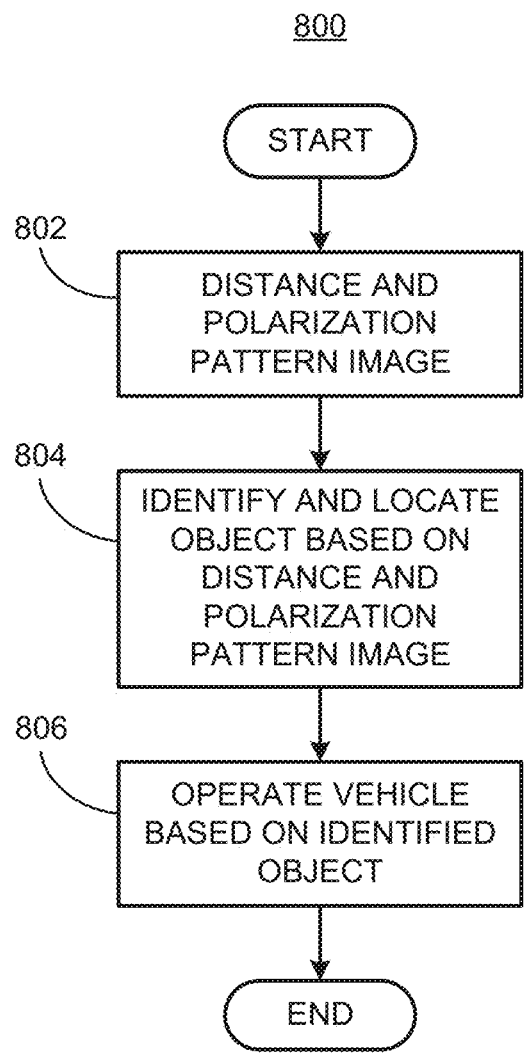
FIG. 8 is a flowchart diagram of an example process to operate a vehicle based on lidar polarization patterns.

FIG. 8 is a flowchart diagram of a process 800 described in relation to FIGS. 1-7, of a process 800 for operating a vehicle based on determining a 3D location and identity of an object. Process 800 can be implemented by a processor of computing device, taking as input information from sensors, and executing commands, and outputting object information, for example. Process 800 includes multiple blocks that can be executed in the illustrated order. Process 800 could alternatively or additionally include fewer blocks or can include the blocks executed in different orders.

Process 800 begins at block 802, where a computing device 115 included in a vehicle acquires a distance and polarization pattern image 630. The distance and polarization pattern image 630 is generated by a polarization lidar sensor 600 as described above in relation to FIG. 6. At each pixel, the distance and polarization pattern image 630 includes a distance measure to a portion of an object 616 and a polarization pattern corresponding to a combined linear and circular polarization measurement of that portion of the object 616. The distance and polarization pattern image 630 can also include zero or NULL data at pixel locations where the signal corresponding to the reflected light $S_r$ 618 was insufficient to measure one or more of a distance, a linear polarization or a circular polarization.

At block 804 a combined distance and polarization pattern image 630 is input to a deep neural network 700 executing on the computing device 115 to process the combined distance and polarization pattern image 630 to determine state cues 710. The state cues 710 correspond to a 3D location and identity of an object 616. For example, the state cues 710 can identify objects as background objects, including a roadway, foliage, terrain, and buildings, or foreground objects including vehicles, pedestrians, traffic signs, and barriers. The identity of the objects is based on one or more polarization patterns and one or more distance measures determined to correspond to an object by the deep neural network 700. For example, an object returning a polarization pattern corresponding to steel as illustrated in Table 1 that is determined to be greater than a minimum size and located at a less than maximum distance from the polarization lidar sensor 600 can be determined to be a vehicle. The state cues 710 include data regarding the identity and the 3D location of an object from the polarization lidar sensor 600.

At block 806 a computing device 115 processes the state cues 710 to determine a vehicle path upon which to operate a vehicle 110. A vehicle path is a polynomial function that can be processed by computing device 115 to generate instructions to be sent to controllers 112, 113, 114 to control vehicle powertrain, steering, and brakes to cause a vehicle 110 to operate along the vehicle path. The vehicle path can be determined to avoid contact with objects in an environment around a vehicle 110 based on the identity and 3D location of an object 616 determined with respect to a polarization lidar sensor 600 and therefore the vehicle 110. Following block 806 process 800 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising a processor; and
a memory, the memory including instructions executable by the processor to:
receive an emitted polarized light beam at a lidar receiver that determines a polarization pattern and a distance to an object, wherein the polarization pattern is determined by comparing a linear polarization pattern and a circular polarization pattern;
identify the object by processing the polarization pattern and the distance with a deep neural network, wherein the identity of the object is metallic or non-metallic; and
operate a vehicle based on the identified object.

2. The computer of claim 1, the instructions including further instructions to compare the linear polarization pattern to the circular polarization pattern by determining a ratio between an intensity of the linear polarization pattern and an intensity of the circular polarization pattern.

3. The computer of claim 1, the instructions including further instructions to train the deep neural network by inputting the polarization pattern and the distance corresponding to the object into the deep neural network and comparing state cues to ground truth corresponding to the identity of the object.

4. The computer of claim 1, the instructions including further instructions to determine the linear polarization pattern by processing the received polarized light beam with an analyzer, wherein the analyzer measures a polarization angle of the received polarized light beam.

5. The computer of claim 1, the instructions including further instructions to determine the circular polarization pattern by processing the received polarized light beam with a quarter wave plate analyzer, wherein the quarter wave plate analyzer measures a circular polarization direction of the received polarized light beam.

6. The computer of claim 1, the instructions including further instructions to emit the polarized light beam as one or more of a pulse and a frequency modulated continuous wave, wherein the distance to the object is based on determining a time between emitting the polarized light beam and receiving the polarized light beam based on one or more of time of flight and phase shifting.

7. The computer of claim 1, the instructions including further instructions to emit the polarized light beam through steering optics that direct the polarized light beam at a plurality of angles with respect to the emitter, wherein a direction to the object is determined by angles at which the polarized light beam was emitted at a time the polarization patterns and the distance were measured.

8. The computer of claim 7, the instructions including further instructions to form an image of the polarization patterns and the distances based on the direction at which the polarized light beam was emitted at the time the polarization patterns and the distance were measured.

9. The computer of claim 8, the instructions including further instructions to input the image of the polarization patterns and the distances to the deep neural network to determine state cues related to the object where the state cues include a location and identity of the object.

10. The computer of claim 9, the instructions including further instructions to operate the vehicle by determining a vehicle path that avoids contact with the located, identified object.

11. The computer of claim 10, the instructions including further instructions to operate the vehicle by controlling one or more of vehicle powertrain, vehicle steering and vehicle brakes to travel on the vehicle path.

12. The computer of claim 1, wherein non-metallic objects include one or more of foliage, pedestrians, and animals.

13. The computer of claim 1, wherein metallic objects include one or more of vehicles, barriers, and traffic signs.

14. The computer of claim 1, the instructions including further instructions to combine the polarization pattern with one or more of video data, radar data, or ultrasound data.

15. A method, comprising:
receiving an emitted polarized light beam at a lidar receiver that determines a polarization pattern and a distance to an object, wherein the polarization pattern is determined by comparing a linear polarization pattern and a circular polarization pattern;

identifying the object by processing the polarization pattern and the distance with a deep neural network, wherein the identity of the object is metallic or non-metallic; and operating a vehicle based on the identified object.

16. The method of claim 15, further comprising comparing the linear polarization pattern to the circular polarization pattern by determining a ratio between an intensity of the linear polarization pattern and an intensity of the circular polarization pattern.

17. The method of claim 15, further comprising training the deep neural network by inputting the polarization pattern and the distance corresponding to the object into the deep neural network and comparing state cues to ground truth corresponding to the identity of the object.

18. The method of claim 15, further comprising determining the linear polarization pattern by processing the received polarized light beam with an analyzer, wherein the analyzer measures a polarization angle of the received polarized light beam.

19. The method of claim 15, further comprising determining the circular polarization pattern by processing the received polarized light beam with a quarter wave plate analyzer, wherein the quarter wave plate analyzer measures a circular polarization direction of the received polarized light beam.

20. The method of claim 15, further comprising emitting the polarized light beam through steering optics that direct the polarized light beam at a plurality of angles with respect to the emitter, wherein a direction to the object is determined by angles at which the polarized light beam was emitted at a time the polarization pattern and the distance was measured.

* * * * *